United States Patent
Murakami

(10) Patent No.: US 7,518,649 B2
(45) Date of Patent: Apr. 14, 2009

(54) IMAGE PICKUP APPARATUS AND CONTROL METHOD THEREFOR, AND CONTROL PROGRAM

(75) Inventor: Taro Murakami, Shibuya-ku (JP)

(73) Assignee: Canon Kabushiki Kaisha (JP)

( * ) Notice: Subject to any disclaimer, the term of this patent is extended or adjusted under 35 U.S.C. 154(b) by 648 days.

(21) Appl. No.: 11/047,107

(22) Filed: Jan. 31, 2005

(65) Prior Publication Data

US 2005/0128341 A1 Jun. 16, 2005

Related U.S. Application Data

(63) Continuation of application No. PCT/JP2004/013192, filed on Sep. 3, 2004.

(30) Foreign Application Priority Data

Sep. 4, 2003 (JP) .............................. 2003-312816

(51) Int. Cl.
 *H04N 5/222* (2006.01)
 *G03B 13/00* (2006.01)
(52) U.S. Cl. .................................. 348/333.01; 348/345
(58) Field of Classification Search ......... 348/345–357, 348/208, 333.01–333.13
See application file for complete search history.

(56) References Cited

U.S. PATENT DOCUMENTS

| | | | | |
|---|---|---|---|---|
| 4,888,609 | A | * | 12/1989 | Hamada et al. ............. 396/104 |
| 5,253,007 | A | * | 10/1993 | Tokura et al. ............... 396/133 |
| 6,876,762 | B1 | * | 4/2005 | Ono ........................... 382/154 |
| 2001/0026263 | A1 | * | 10/2001 | Kanamori et al. ........... 345/156 |
| 2002/0003956 | A1 | * | 1/2002 | Inagaki ....................... 396/89 |

FOREIGN PATENT DOCUMENTS

| JP | 3302132 B2 | 4/2002 |
|---|---|---|
| JP | 2003-32521 A | 1/2003 |
| JP | 2003-348426 A | 12/2003 |

OTHER PUBLICATIONS

Relevant portion of International Search Report, mailed on Dec. 28, 2004, in corresponding application: PCT/JP2004/013192.

* cited by examiner

*Primary Examiner*—Sinh N Tran
*Assistant Examiner*—Tuan H Le
(74) *Attorney, Agent, or Firm*—Rossi, Kimms & McDowell, LLP

(57) ABSTRACT

An image pickup apparatus is provided which enables a user to follow up an object while viewing a display screen, and can prevent an image shake from being reflected on the display screen. An image pickup device outputs a signal in response to light received from an object via a lens section unit. A drive ring is rotated by the driving force of the AF motor to enable the lens section unit to move in a direction along the optical axis, to thereby carry out focus adjustment based on the signal output from the pickup device. A LCD displays an image based on the signal output from the image pickup device. The LCD displays the image according to through display when the lens section unit is being moved in a direction of extension, and the through display by the LCD is restrained after the lens section unit is reversed and is moved in a direction of retraction and until it is stopped.

5 Claims, 13 Drawing Sheets

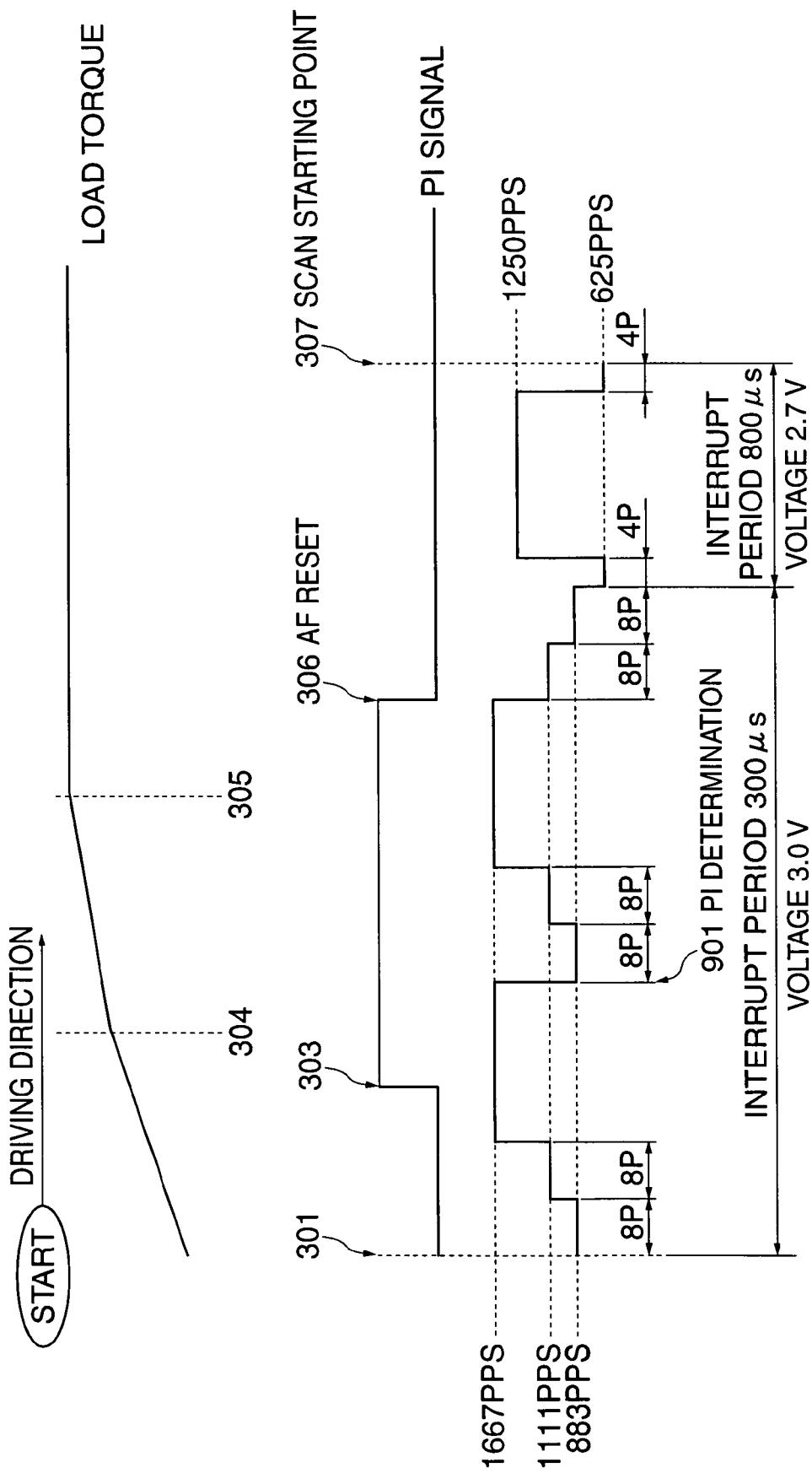

IMAGE PICKUP APPARATUS AND CONTROL METHOD THEREFOR, AND CONTROL PROGRAM

This application is a continuation of International Application PCT/JP2004/013192 having an international filing date of Sep. 3, 2004 claiming priority from Japanese Application 2003-312816 filed on Sep. 4, 2003.

TECHNICAL FIELD

The present invention relates to an image pickup apparatus such as a silver salt film camera, electronic camera, digital camera or video camera and a control method therefor, as well as a control program for implementing the control method.

BACKGROUND ART

Conventionally, in a retractable-lens camera which is provided with a retractable lens, the zooming and focusing of the lens is typically carried out upon extension of the lens by a lens-extension mechanism. For a lens-extension mechanism for a camera of this type, an arrangement in which an annular drive ring with a cam is rotated, and a member that retains the lens is provided with a translatory movement mechanism that moves the lens along the optical axis while inhibiting rotation of the same is widely used. However, with miniaturization of the image pickup means such as a CCD and an increase in the number of pixels, this arrangement for moving the annular drive ring is now required to have high accuracy in the positions of the focus lens and the zoom lens along the optical axis.

On the other hand, when the lens is extended from its retracted state, the lens barrel is likely to be touched on the outer surface by the user, and therefore a lens barrel is required which has a strong and robust structure so that it cannot be damaged or broken nor dislocated in position even when touched. However, the stronger the lens barrel is structured, the greater load the actuator for extending the lens undergoes. In view of this, the actuator is implemented by a DC motor or a stepping motor and is decelerated at a reduction ratio of hundreds using a number of gears to drive the lens with increased torque.

However, when a force is applied to component parts of the camera, there occur backlash or play of the gears and the drive ring and play of the cam pin in the cam groove, causing slight deformations of these members or parts. Consequently, when the lens is driven, a difference (position difference) occurs in the position of the lens between when the lens is driven to move in one direction and when it is driven to move in the opposite direction. Specifically, such position difference includes relatively simple hysteresis in the lens position along the optical axis, and a shift or inclination of the lens in a direction perpendicular to the optical axis and in the rotational direction.

Since the lens cannot be accurately controlled to proper positions without such hysteresis taken into account, a sensor capable of detecting the absolute position of the lens is installed, or to stop the lens, control is provided so that the lens is always moved in a predetermined direction before it is stopped. When the lens is moved in the opposite direction to that direction, a hysteresis eliminating operation is carried out such that the lens is moved a little beyond an intended stop position and then reversed and returned by the same distance to the stop position. Moreover, when the lens undergoes a position difference such as shift or inclination, an image formed by the lens changes so that an image shake occurs when the driving direction of the lens is reversed.

As one of techniques of performing focus adjustment using an image pickup signal in an image pickup apparatus, there has been proposed a technique in which, when auto focus is carried out, an image before a signal is captured from an image pickup device is stored for focus adjustment, and the stored image is displayed on a display screen of an image display means when focus adjustment is carried out (see Japanese Patent Publication No. 3302132, for example). A method of displaying an image output from an image pickup device on an image display means is referred to as "through display". An example of the through display is that in the case of a moving object, a displayed image is changed according to the movement of the object. On the other hand, a method of temporarily restraining the through display and then displaying the stored image on the screen is referred to as "freeze display". For example, according to the freeze display, the stored image is displayed in a manner not responding to movement of the object even when the object is moving.

Further, as auto focus (AF) according to the so-called mountain-climbing method, a technique has been disclosed in which, when a focus evaluation value as data on high frequency components of frequencies of an image pickup signal output from an image pickup device has decreased, the through display is switched to the freeze display, whereas, when the focus evaluation value has increased, the through display is carried out (see Japanese Laid-Open Patent Publication (Kokai) No. 2003-32521, for example). This technique causes only an image in focus for which a high focus evaluation value is given to be displayed, while inhibiting an image out of focus from being displayed.

However, there have been the following problems with the above-described examples of the prior art:

In the case where the freeze display is carried out all the time during focus adjustment, for example, in shooting a moving object, it is difficult to follow up the moving object while viewing the display screen. Further, in the case where the freeze display is carried out when the focus evaluation value has decreased, if the object obliquely moves away from or toward the camera, it is also difficult to follow up the object on the display screen, and thus, when shooting a moving object, it is desirable to avoid the freeze display from being carried out, to the maximum possible extent.

In the case of the mountain-climbing method in particular, to detect the direction in which the image comes into focus, it is necessary to violently or quickly move the focus lens forward and backward, such as wobbling. However, in the case where the through display is carried out only when the focus evaluation value has increased, if there occurs a position difference of the lens such as a shift or inclination, there is the possibility that the through display is carried out irrespective of the direction in which the lens is moving, so that the displayed image shakes when the focus evaluation value is just below or above its top value, giving an unpleasant feeling to the user.

In view of the above described problems with the prior art, it is an object of the present invention to provide an image pickup apparatus and a control method which enable a user to follow up an object while viewing a display screen, and can prevent an image shake from being reflected on the display screen, and a control program for implementing the control method.

DISCLOSURE OF THE INVENTION

To attain the above object, in a first aspect of the present invention, there is provided an image pickup apparatus comprising image pickup unit that outputs a signal in response to light received from an object via a lens unit, lens moving unit that is capable of moving the lens unit in a direction along the optical axis, adjusting unit that carries out focus adjustment based on the signal output from the image pickup unit according to movement of the lens unit, display unit that displays an image based on the signal output from the image pickup unit, and control unit that provides control such that the display unit displays the image when the lens unit is being moved in a first direction, and a limitation is imposed upon the display by the display unit when the lens unit is moved until it is stopped after the lens unit is reversed from the first direction to a second direction.

In the first aspect of the present invention, it is preferable that the limitation upon the display by the display unit comprises continuously displaying the image displayed when the lens unit is reversed.

In the first aspect of the present invention, it is preferable that the limitation upon the display by the display unit comprises continuously displaying the image displayed when the lens unit is being moved in the first direction.

In the first aspect of the present invention, it is preferable that the limitation upon the display by the display unit comprises inhibiting the display unit from displaying the image.

In a second aspect of the present invention, there is provided an image pickup apparatus comprising image pickup unit that outputs a signal in response to light received from an object via a lens unit, lens moving unit that is capable of moving the lens unit in a direction along the optical axis, adjusting unit that carries out focus adjustment based on the signal output from the image pickup unit according to movement of the lens unit, display unit that displays an image based on the signal output from the image pickup unit, and control unit that controls the lens moving unit to move the lens unit at a first speed when the lens unit is moved in a first direction, and for controlling the lens moving unit to move the lens unit at a second speed higher than the first speed when the lens unit is moved to a stopping position after the lens unit is reversed from the first direction to a second direction.

In a third aspect of the present invention, there is provided a control method for controlling an image pickup apparatus including image pickup unit that outputs a signal in response to light received from an object via a lens unit, lens moving unit that is capable of moving the lens unit in a direction along the optical axis, adjusting unit that carries out focus adjustment based on the signal output from the image pickup unit according to movement of the lens unit, and display unit that displays an image based on the signal output from the image pickup unit, the control method providing control such that the display unit displays the image when the lens unit is being moved in a first direction, and a limitation is imposed upon the display by the display unit when the lens unit is moved until it is stopped after the lens unit is reversed from the first direction to a second direction.

In a fourth aspect of the present invention, there is provided a control method for controlling an image pickup apparatus including image pickup unit that outputs a signal in response to light received from an object via a lens unit, lens moving unit that is capable of moving the lens unit in a direction along the optical axis, adjusting unit that carries out focus adjustment based on the signal output from the image pickup unit according to movement of the lens unit, and display unit that displays an image based on the signal output from the image pickup unit, the control method being characterized by controlling the lens moving unit to move the lens unit at a first speed when the lens unit is moved in a first direction, and controlling the lens moving unit to move the lens unit at a second speed higher than the first speed when the lens unit is moved to a stopping position after the lens unit is reversed from the first direction to a second direction.

In a fifth aspect of the present invention, there is provided a program for implementing a control method for controlling an image pickup apparatus including image pickup unit that outputs a signal in response to light received from an object via a lens unit, lens moving unit that is capable of moving the lens unit in a direction along the optical axis, adjusting unit that carries out focus adjustment based on the signal output from the image pickup unit according to movement of the lens unit, and display unit that displays an image based on the signal output from the image pickup unit, the control method providing control such that the display unit displays the image when the lens unit is being moved in a first direction, and a limitation is imposed upon the display by the display unit when the lens unit is moved until it is stopped after the lens unit is reversed from the first direction to a second direction.

In a sixth aspect of the present invention, there is provided a program for implementing a control method for controlling an image pickup apparatus including image pickup unit that outputs a signal in response to light received from an object via a lens unit, lens moving unit that is capable of moving the lens unit in a direction along the optical axis, adjusting unit that carries out focus adjustment based on the signal output from the image pickup unit according to movement of the lens unit, and display unit that displays an image based on the signal output from the image pickup unit, the control method being characterized by controlling the lens moving unit to move the lens unit at a first speed when the lens unit is moved in a first direction, and controlling the lens moving unit to move the lens unit at a second speed higher than the first speed when the lens unit is moved to a stopping position after the lens unit is reversed from the first direction to a second direction.

BRIEF DESCRIPTION OF THE DRAWINGS

FIG. 10 is a sequence diagram showing driving of the lens barrel immediately after power is turned on when the capacity of a battery is determined to be sufficient;

BEST MODE FOR CARRYING OUT THE INVENTION

The present invention will now be described with reference to the drawings showing a preferred embodiment thereof.

Figure 1:
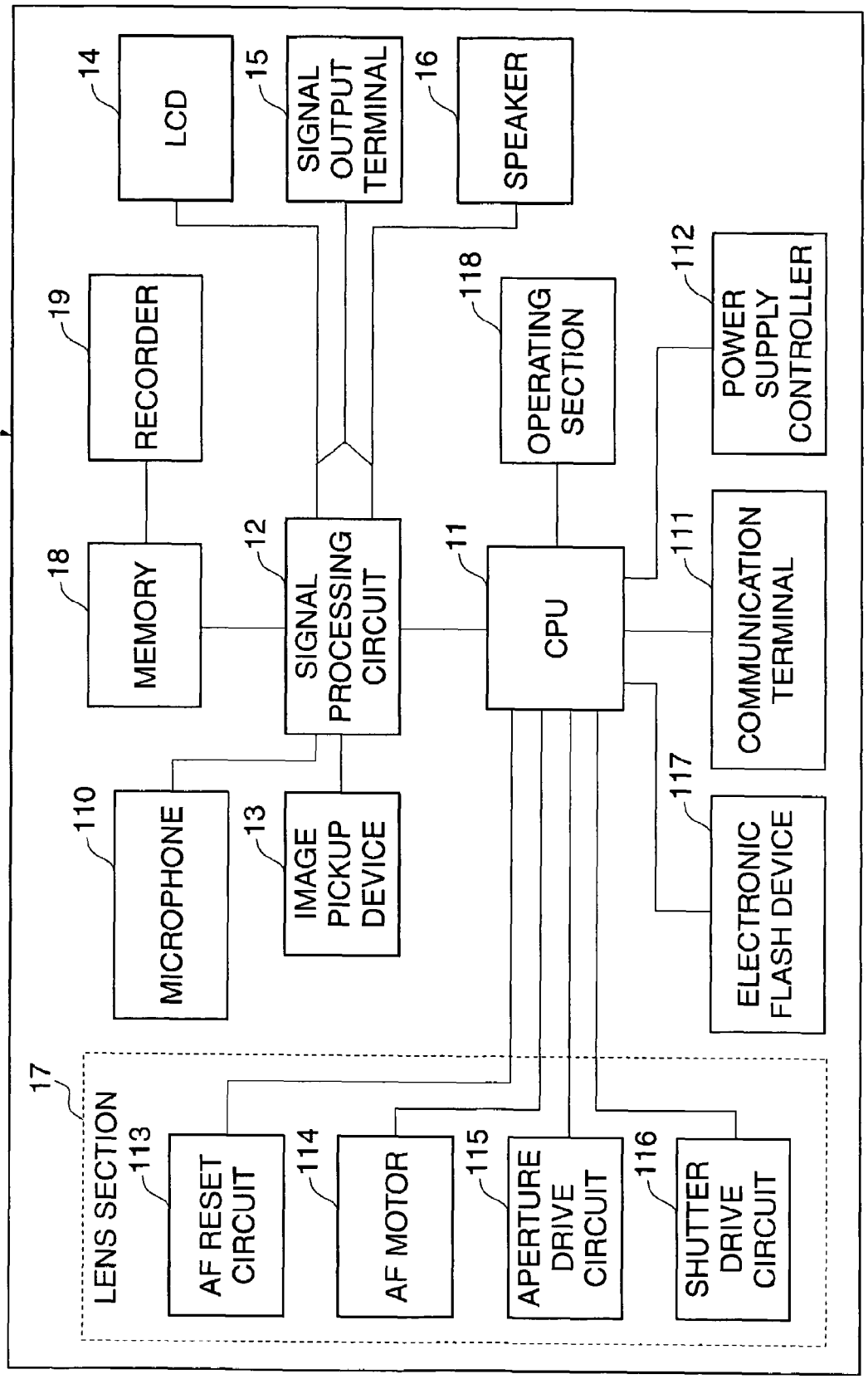
FIG. 1 is a block diagram showing the construction of a digital camera as an image pickup apparatus according to an embodiment of the present invention.

FIG. 1 is a block diagram showing the electrical configuration of a digital camera as an image pickup apparatus according to an embodiment of the present invention.

The digital camera 1 includes a CPU 11 that controls the operation of the entire camera, to which a signal processing circuit 12 is connected. Connected to the signal processing circuit 12 is an image pickup device 13 such as a CCD, a microphone 110 that inputs audio, and image display device 14 such as a LCD (transmissive liquid crystal display). Further connected to the signal processing circuit 12 are signal output terminals 15 for outputting image signals and audio signals to external devices, a speaker 16 that outputs audio signals, and a memory 18.

The image pickup device 13 photoelectrically converts an image focused by a lens section 17 into an electrical signal and outputs the same as a video signal. The signal processing circuit 12 subjects the video signal to various processing including amplification, A/D conversion, gamma processing, compression, and D/A conversion. The microphone 110 converts audio into an electrical signal and outputs the same to the signal processing circuit 12. The signals processed by the signal processing circuit 12 are then input to the LCD 14 and the speaker 16 to be displayed by the LCD 14 and output by the speaker 16, respectively, as video and audio outputs, and at the same time output through the signal output terminals 15 to a monitor or other external device outside the digital camera.

Connected to the CPU 11 are an operating section 118, a communication terminal 111, a power supply controller 112 and an electronic flash device 117, as well as various circuits of the lens section 17 (i.e., AF reset circuit 113, AF motor 114, aperture drive circuit 115 and shutter drive circuit 116).

The operating section 118 is comprised of a variety of operating switches for controlling the operation of the digital camera, such as a variety of operating buttons and a release button. The power supply controller 112 is comprised of a battery that supplies electrical power to the digital camera as a whole, a DC/DC converter that creates voltages supplied to various parts, a control circuit that controls voltage currents supplied to various parts, and a battery check circuit that measures voltage to check the battery.

When shooting a moving image, a video signal output from the image pickup device 13 is processed by the signal processing circuit 12, autoexposure (AE) is carried out using the processed signal to determine an exposure amount, and the aperture drive circuit 115 is activated to determine an aperture value.

When shooting a still image, by pressing the release button, not shown, provided in the operating section 118, first, the AF reset circuit 113 and the AF motor 114 are activated so as to focus an image through the lens section 17. Then, autoexposure is carried out using the output from the image pickup device 13 to determine the aperture value and shutter speed that provide the optimum exposure, and the aperture drive circuit 115 is driven to control the aperture for optimum exposure.

Next, the image pickup device 13 is reset and charge accumulation is started by photoelectric conversion. The shutter drive circuit 116 is driven to close the shutter so as to achieve the shutter speed determined by the autoexposure. If the exposure is insufficient, the electronic flash device 117 is activated within a time period for which the shutter is open from the start of charge accumulation. The photographed video signal is then processed by the signal processing circuit 12 and the processed still image data is buffered in the memory 18 and recorded on a replaceable memory medium by a recording section 19.

Meanwhile, when the screen on the LCD 14 is displayed according to the freeze display, similarly, the video signal is processed by the video signal processing circuit 12, and the still image data is buffered in the memory 18. The buffered still image data continues to be reproduced. When the LCD 14 screen is displayed according to the through display, data processed by the signal processing circuit 12 continues to be sequentially reproduced as it is. By doing so, a real-time through display image can be displayed on the LCD 14 screen.

Figure 2:
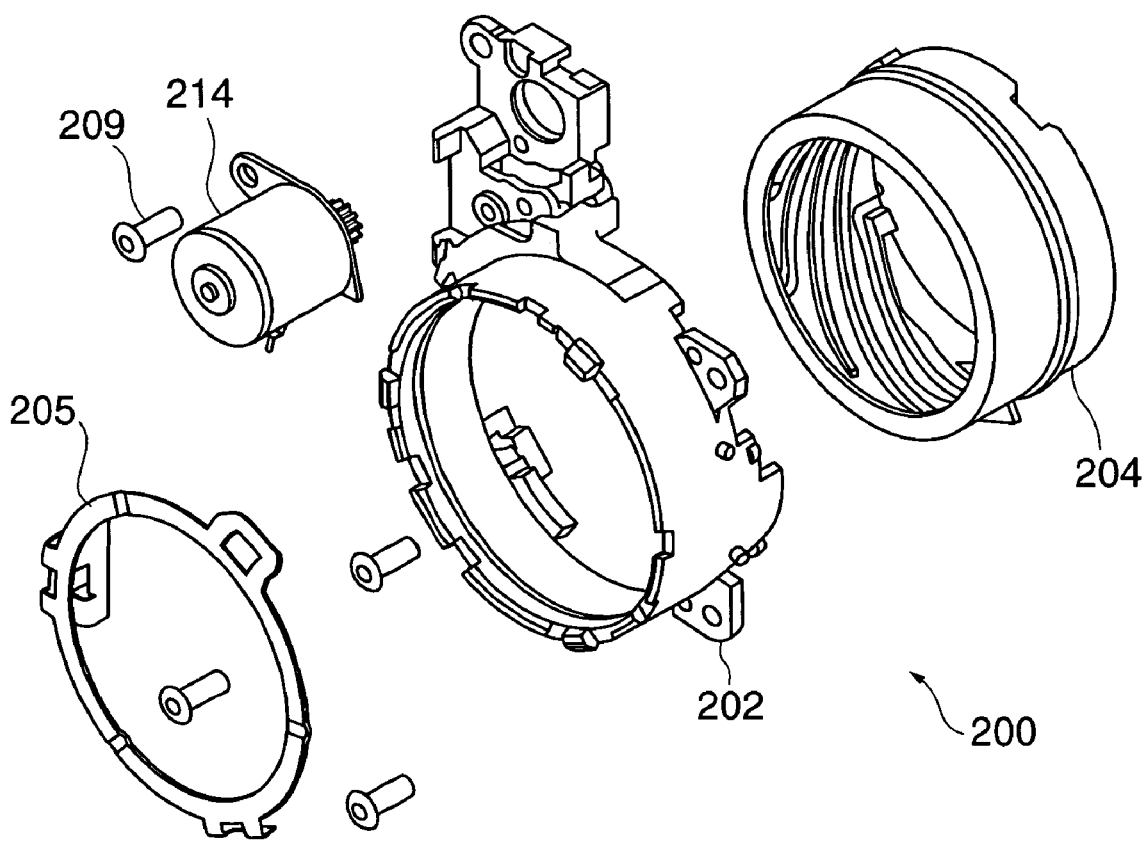
FIG. 2 is an exploded perspective view showing parts of a lens barrel of the digital camera.
Figure 3:
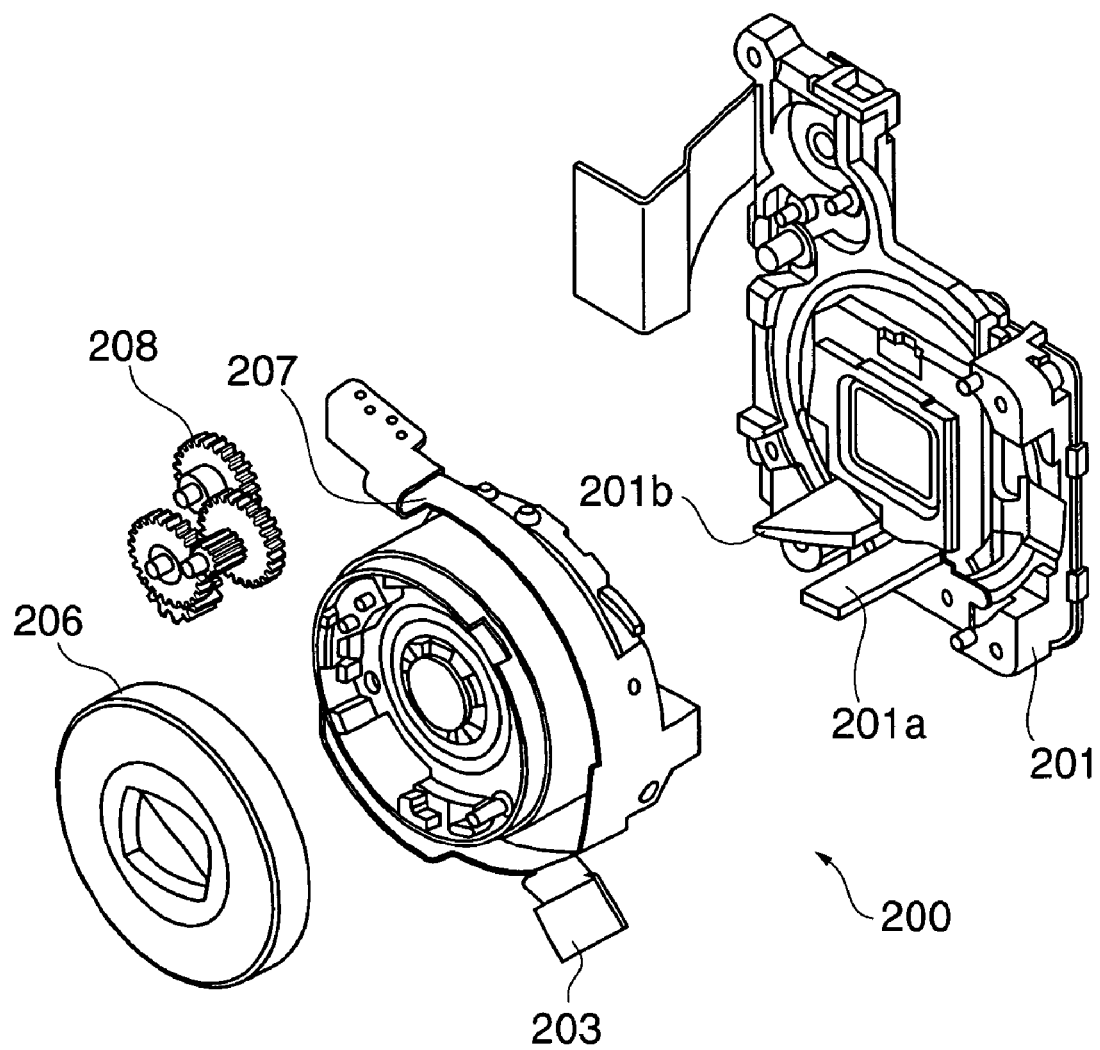
FIG. 3 is an exploded perspective view showing parts of a lens barrel of the digital camera.

FIGS. 2 and 3 are exploded perspective views showing parts of a lens barrel of the digital camera.

In FIGS. 2 and 3, reference numeral 200 designates a lens barrel, and reference numeral 201 a CCD holder unit. The CCD holder unit 201 is a frame that retains image pickup and optical parts such as a CCD and a low pass filter, and forms a single unit together with a translatory movement key 201a and a barrier cam part 201b. Reference numeral 202 designates a fixed lens barrel formed of an electrically nonconductive material, and reference numeral 204 designates a drive ring formed of an electrically conductive material. The fixed lens barrel 202 serves to permit movement of the drive ring 204 in a direction of rotation thereof while inhibiting movement of the same in other directions. Reference numeral 205 designates a bias spring formed of a metal leaf spring.

The drive ring 204 is sandwiched between the CCD holder unit 201 and the fixed lens barrel 202, and is urgingly biased from the fixed lens barrel 202 toward the CCD holder unit 201 by the bias spring 205 so as to fix the position of the drive ring 204 along the optical axis. The drive ring 204 and the bias spring 205 are in direct contact with each other, and are electrically connected to each other at the same electric potential.

Reference numeral 206 designates a barrier unit, which is comprised of two barrier blades which are opened and closed to protect the lens when the lens is retracted into the camera.

Reference numeral 207 designates a lens section unit (corresponding to the lens section 17 in FIG. 1). The lens section unit 207 supports the lens section and contains the aperture and the shutter, with the aperture and shutter driven by electrical signals transmitted through a lens barrel tab 203. In the lens barrel 200, the translatory movement key 201a engages a groove in the lens section unit 207 so that the lens section unit 207 can move forward and backward along the optical axis.

Figure 4:
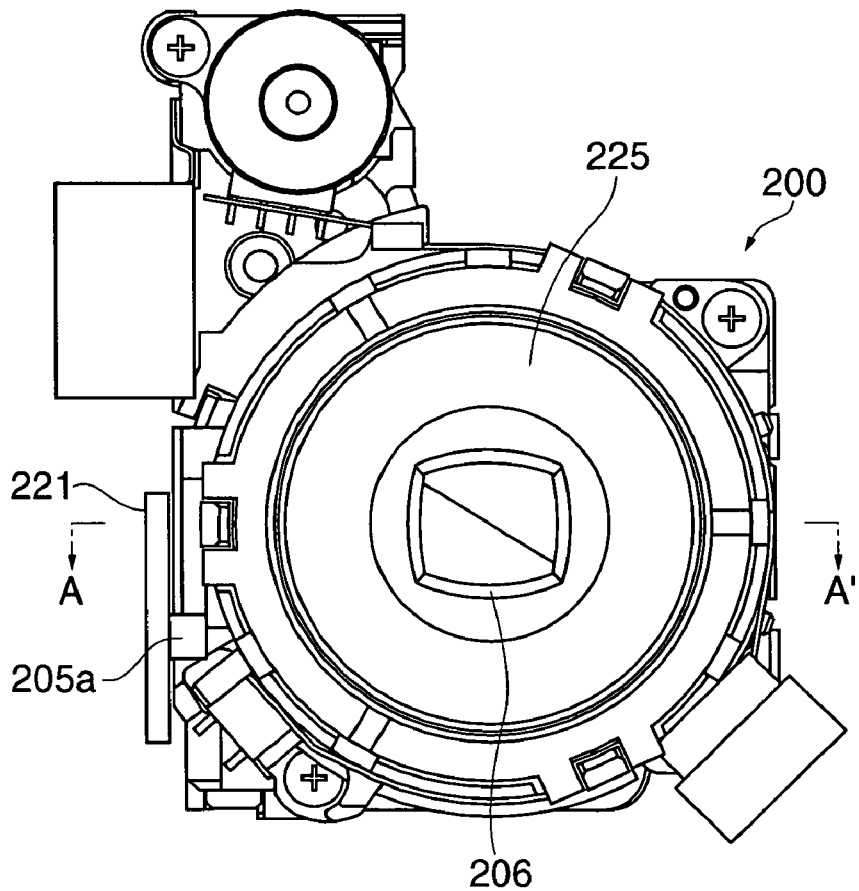
FIG. 4 is a front view showing the lens barrel of the digital camera.
Figure 5:
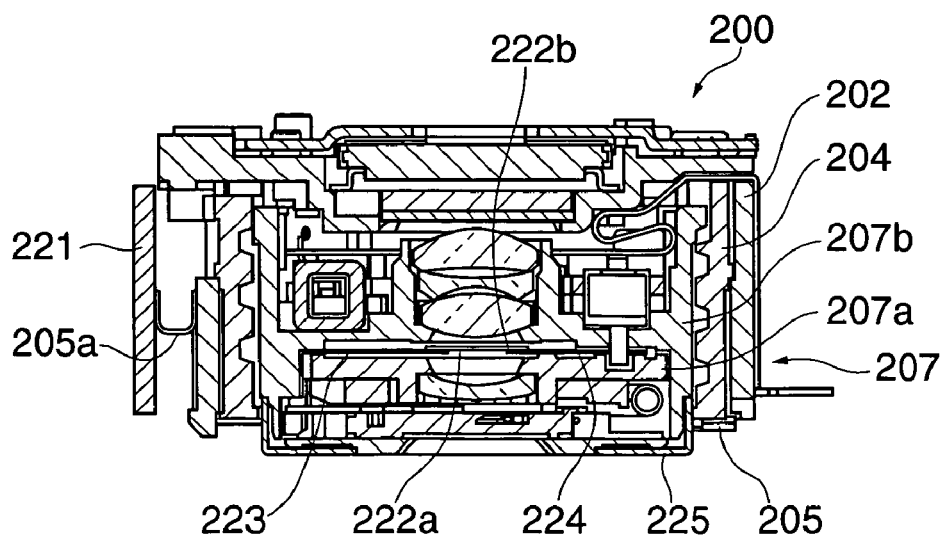
FIG. 5 is a sectional view taken along line A-A' in FIG. 4.

FIG. 4 is a front view showing the lens barrel 200 of the digital camera 1, and FIG. 5 is a sectional view taken along line A-A' in FIG. 4.

The lens section unit 207 is divided into a lens (1) group frame 207a and a lens (2) group frame 207b, and these two parts are directly tightened together by screws. Both of the parts are made of an electrically conductive carbon-containing molded member and they are electrically connected together and held at the same electric potential.

Between the lens (1) group frame 207a and the lens (2) group frame 207b, two shutter blades 222a and 222b, fixed open aperture 223, and small aperture blade 224 are mounted in a manner sandwiched therebetween. The small aperture blade 224 moves with its one side surface in sliding contact with the lens group frame 207a and the other side surface with the fixed open aperture 223. Moreover, the two shutter blades 222a and 222b are driven while sliding against each other and with one side surface of the shutter blade 222a in sliding contact with the fixed open aperture 223 and one side surface of the shutter blade 222b in sliding contact with the lens (2) group frame 207b.

As the material of the blades used as parts of the shutter and aperture, an electrically conductive sheet material is generally used for prevention of static electricity due to friction, and also in the present embodiment, such conductive material is used. Therefore, the static electricity that occurs due to the friction of the aperture and the shutter when driven escapes to the entire interior of the lens section unit 207 because the blades used in the aperture and the shutter contact the lens (1) group frame 207a and the lens (2) group frame 207b as mentioned above.

In FIG. 4, reference numeral 225 designates a barrier cap as a metal member provided on the front surface of the lens barrel 200. In the case where static electricity arrives at the lens barrel 200 from outside, first, the static electricity enters into the barrier cap 225, passes through the portion of contact of the barrier cap 225 with the lens (2) group frame 207b, and escapes to the entire lens section unit 207.

Further, in FIG. 3, reference numeral 208 designates a reduction gear group, and in FIG. 2, reference numeral 214 designates an AF motor that is comprised of a stepping motor (corresponding to the AF motor 114 in FIG. 1). The rotational speed of the AF motor 214 is decelerated by the reduction gear group 208 to increase the driving force (torque) of the AF motor 214, and this increased driving force is transmitted to a gear provided outside the drive ring 204 to thereby cause the drive ring 204 to rotate. A cam groove and a helicoid depression are provided in the drive ring 204, which are meshed with a cam pin and a helicoid protuberance formed on the lens section unit 207. The drive ring 204 is formed of an electrically conductive material and electrically connected to the lens section unit 207 through the cam pin thereof and held at the same potential as the latter. Rotation of the drive ring 204 causes rotation of the cam groove so that the cam and the translatory movement key 201a cooperate to cause the lens section unit 207 to move along the optical axis without rotating.

To obtain a smooth movement of the lens section unit 207 in the lens barrel 200 due to rotation of the drive ring 204, the members that move with movement of the lens section unit 207 are given slight amounts of backlash or play therebetween. Therefore, in particular, a backlash or play between the translatory movement key 201a and the groove in the lens section unit 207 in which the key 201a is engaged and a backlash or play between the drive ring 204 and the fixed lens barrel 202 cause the lens section unit 207 to provide a slight rotating movement or shift (a movement in a direction perpendicular to the optical axis), whereby inclination of the lens and/or a positional change in the optical axis, which can affect the image. Further, when the rotational direction of the drive ring 204 is reversed, the concerned members move in the direction of rotation of the drive ring 204 by an amount corresponding to a backlash or play therebetween, so that these members change in position, i.e. in the direction in which they are shifted by such backlash or play, resulting in inclination or shift of the lens and hence an image shake.

It should be noted that a small gap is provided between the helicoid depression and protuberance so that the depression and the protuberance do not mesh with each other. This gap is configured such that the helicoid depression and the protuberance effectively act only when the drive ring 204 is deformed by an external force or impact applied thereto. By so setting, damage to the cam pin and the cam groove such as deformation, breakage or crack can be prevented when an impact is given to them, for example.

With the above configuration, static electricity occurring in the aperture and shutter in the lens section unit 207 and static electricity arriving at the front end of the lens barrel 200 from outside can be transferred to the bias spring 205 at the same potential. The bias spring 205 is formed integrally with an armature 205a, and a ground substrate 221 as shown in FIGS. 4 and 5 is disposed at a location where it contacts the armature 205a. By thus causing the ground substrate 221 and the armature 205a to conduct, static electricity can escape from the armature 205a onto the ground substrate 221. Therefore, in assembling the lens barrel 200, no troublesome operation such as wiring of leads is required and the assemblage is facilitated. The portion of conduction of the ground substrate 221 with the armature 205a is electrically connected to the ground of the digital camera 1.

In the lens barrel 200, only the two parts, i.e. the lens group frames 207a and 207b, are formed of electrically conductive carbon-containing molded members and grounded via a single leaf spring (the bias spring 206). Therefore, it is not necessary to form the CCD holder unit 201 and the fixed lens barrel 202 of a carbon material, enabling a reduction in the cost.

Figure 6:
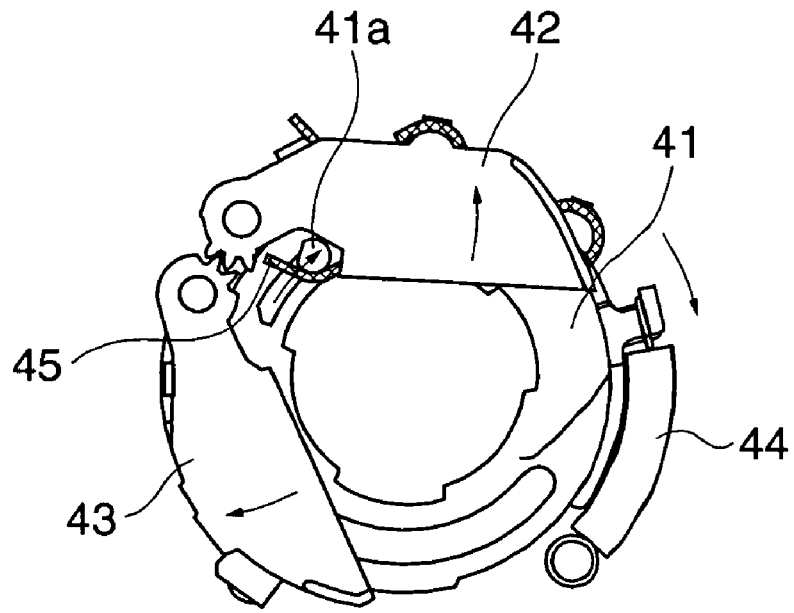
FIG. 6 is a view useful in explaining the operation of a barrier unit of the lens barrel (barrier open)
Figure 7:
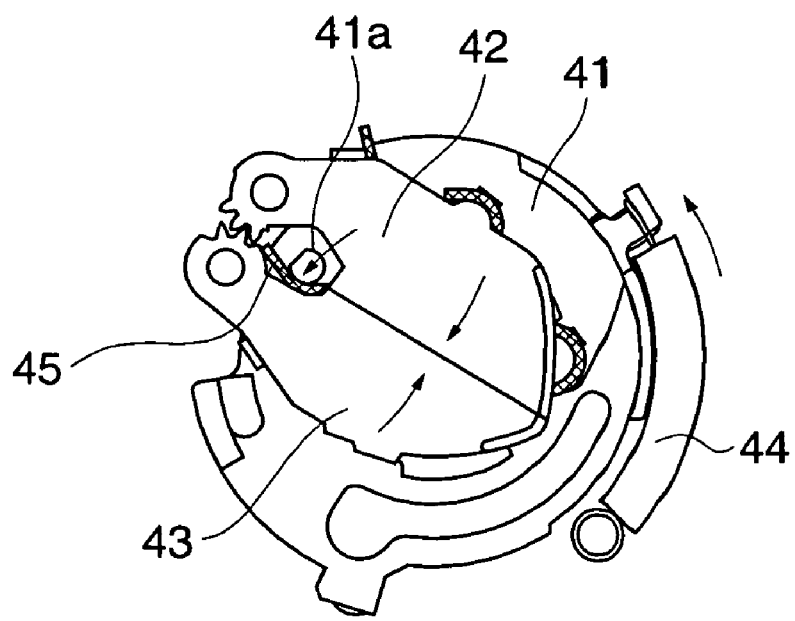
FIG. 7 is a view useful in explaining the operation of a barrier unit of the lens barrel (barrier closed)

FIGS. 6 and 7 are views useful in explaining the operation of the barrier unit 206 of the lens barrel 200, with FIG. 6 showing the barrier unit in an open state and FIG. 7 showing the barrier unit in a closed state.

In FIGS. 6 and 7, reference numeral 41 designates a barrier drive ring, as a member that drives the barrier unit 206, 42 a barrier blade (1), and 43 a barrier blade (2). Reference numeral 44 designates an opening spring that applies a load to the barrier drive ring 41 in a direction in which it opens, and reference numeral 45 designates a closing spring. The closing spring 45 is a hook-shaped spring, which engages a projecting part 41a formed on the barrier drive ring 41. The force of the closing spring 45 biases the barrier blade (1) 42 in a direction in which it closes. The barrier blade (1) 42 and the barrier blade (2) 43 are meshed with each other via gears formed thereon at rotation axes thereof, so that, when the barrier blade (1) 42 rotates, the barrier blade (2) 43 rotates in the opposite direction.

To bring the barrier unit 206 into the open state shown in FIG. 6, the barrier drive ring 41 is rotated clockwise by the opening spring 44, so that the barrier blade (1) 42 is pressed by the projecting part 41a to be rotated counter-clockwise. Accordingly, the barrier blade (2) 43 is also rotated clockwise, opening the lens barrier.

Next, a description will be given of the operation when the lens barrier is closed. The barrier drive ring 41 inside the barrier unit 206 is depressed by a cam surface of the barrier cam part 201b and the barrier drive ring 41 rotates counter-clockwise against the force of the opening spring 44. At this time, the projecting part 41a drops down as a result of the rotation, and accordingly, at the same time the barrier blade (1) 42 rotates clockwise due to the action of the closing spring 45. Then, the meshing of the gears causes the barrier blade (2) 43 to rotate counter-clockwise as well, stopping at a point at which the two blades 42, 43 meet (see FIG. 7). The barrier drive ring 41 can rotate up to the state shown in FIG. 7. The projecting part 41a continues to rotate and opens the closing spring 45 even after the barrier blade (1) 42 stops, to thereby augment the closing force of the barrier.

As described above, the image pickup apparatus of the present embodiment is configured such that the barrier unit 206 is combined with the lens section unit 207 and these two parts are moved as a single unit forward and backward along the optical axis, whereby the action of the barrier drive ring 41 inside the barrier unit 206 urgingly contacting the cam surface of the barrier cam part 201b and the spring force of the opening spring 44 cooperate to cause the barrier drive ring 41 to be rotated, and the rotation of the barrier drive ring 41 and the action of the closing spring 45 cooperate to cause the two barrier blades 42, 43 to be opened and closed.

Figure 8:
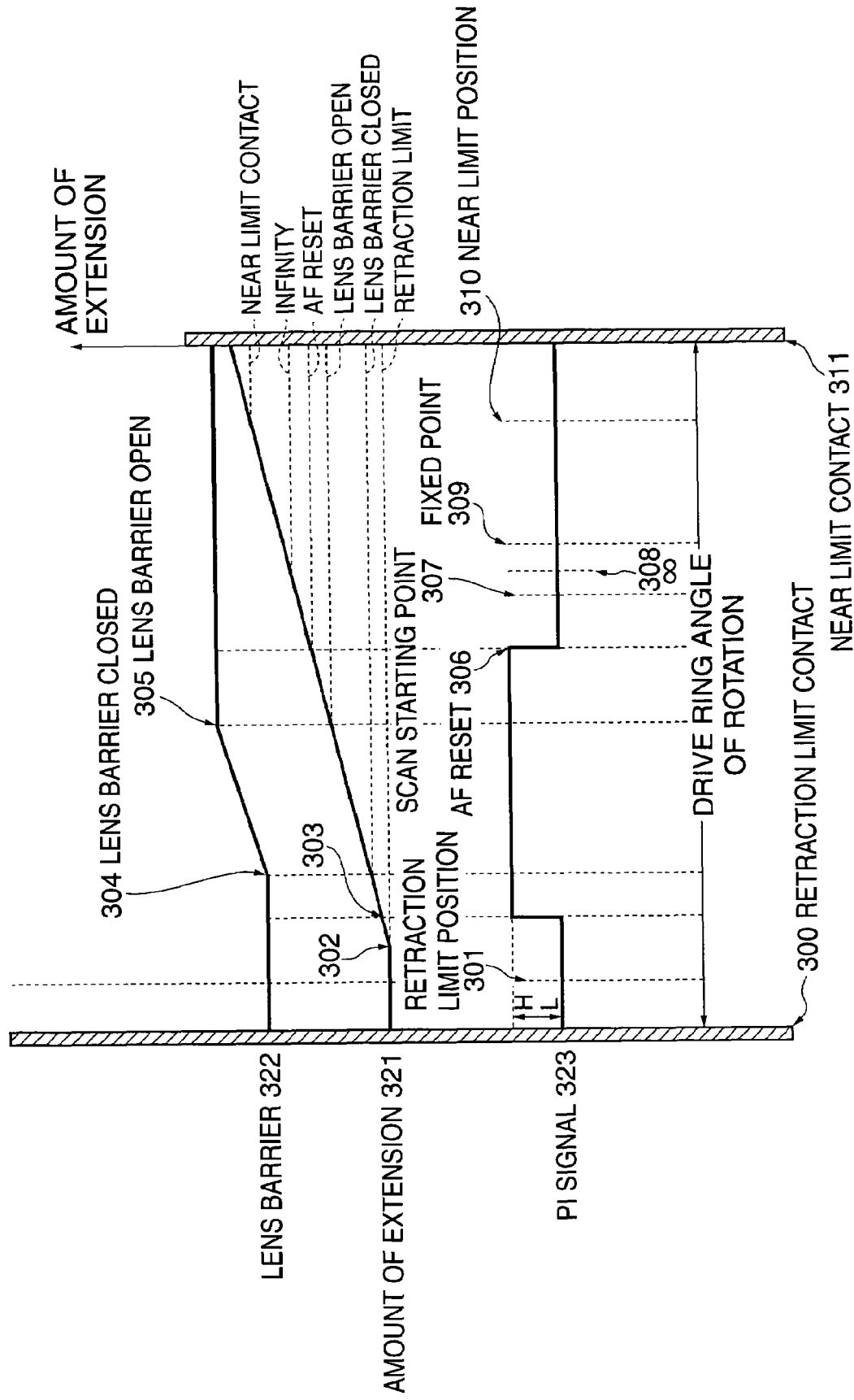
FIG. 8 is a diagram showing the relationship between the state of a barrier, reset timing of a lens, and an amount of extension, plotted with respect to the rotational angle of a drive ring of the lens barrel.

FIG. 8 shows the relationship between the lens barrier state, the focus lens reset timing and extension of the focus lens, plotted with respect to the rotational angle of the drive ring 204 of the lens barrel 200.

In FIG. 8, the abscissa indicates the rotational angle of the drive ring 204. With rotation of the drive ring 204, the focus lens is extended and retracted. In FIG. 8, reference numeral 321 indicates the amount of extension of the focus lens corresponding to the rotational angle of the drive ring 204. Reference numeral 322 indicates the state of the barrier at this time, and reference numeral 323 indicates a reset signal (PI signal).

Reference numerals 300 and 311 in FIG. 8 designates a retraction limit contact and a near limit contact. As a stopper of the drive ring 204 mechanically strikes the contact 300 or 311, the rotation of the drive ring 204 stops, thus preventing the focus lens from moving to an excessive degree.

When the AF motor 114 starts to rotate from a retraction limit position 301 thereof, the focus ring remains stopped until the rotational angle of the drive ring 204 reaches a predetermined angle indicated by a position 302. Immediately after the rotational angle of the drive ring 204 exceeds the predetermined angle 302, the focus lens starts to be extended. At a position 303 immediately after the start of extension of the focus lens, the reset signal 323 switches from a low level ("L") to a high level ("H").

Figure 9A:
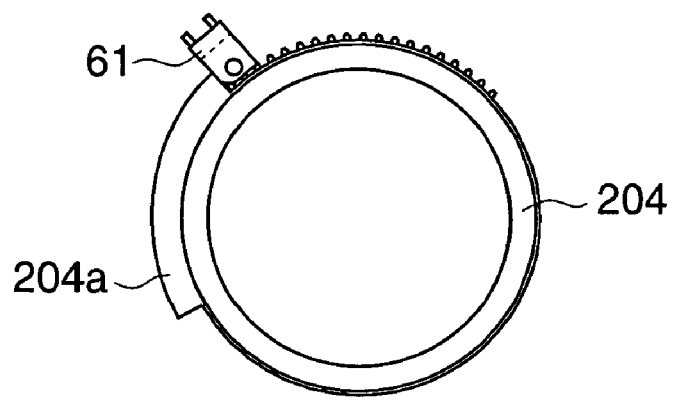
FIGS. 9A to 9C are views showing the relationship between a drive ring of the lens barrel and a rest member (PI)
Figure 9B:
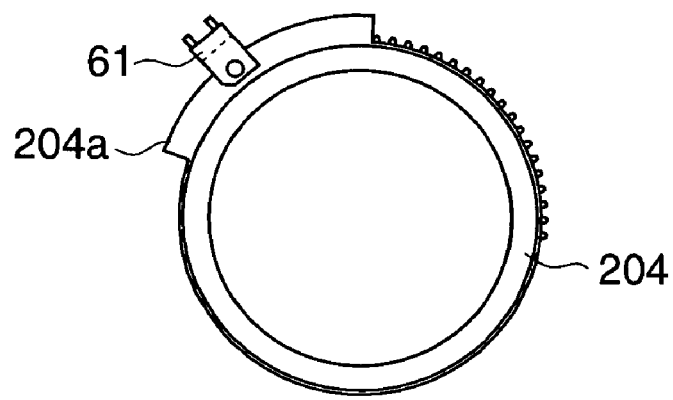
Figure 9C:
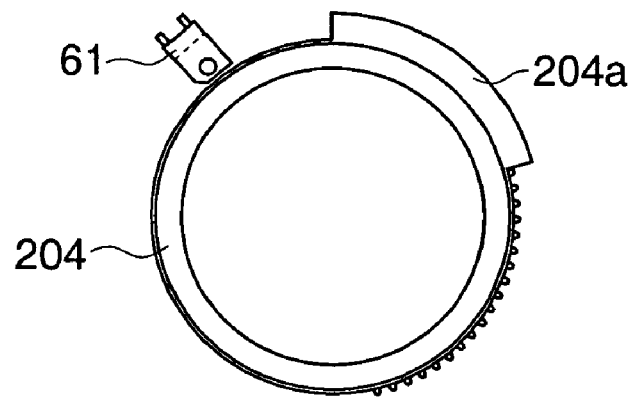

Here, how the reset signal 323 switches will be described with reference to FIGS. 9A, 9B and 9C. FIGS. 9A, 9B and 9C are views illustrating the relationship between the drive ring 204 and a reset member (PI) 61. A state corresponding to the retraction limit position 301 in FIG. 8 is shown in FIG. 9A, a state corresponding to a barrier open position 305 in FIG. 8 is shown in FIG. 9B and a state corresponding to a near limit position 310 in FIG. 8 is shown in FIG. 9C. Reference numeral 204a in FIGS. 9A, 9B and 9C designates a flange formed integrally with the drive ring 204. An LED and a photoreceptive element as a light sensor are disposed within the reset member 61. The reset member outputs a "H" level output when the flange 204a blocks light emitted from the LED, and otherwise, it outputs a "L" level output.

As described above, at the position 303 the reset signal 323 switches to "H". As the focus lens is further extended, the barrier unit 206, through the action of the barrier cam 201b, gradually opens the lens barrier at a phase at which the drive ring 204 rotates from the barrier closed position 304 to the barrier open position 305. The lens barrier is fully opened at the barrier open position 305, and after this barrier open position 305 is exceeded, the cam surface of the barrier cam 201b and the barrier drive ring 41 become separated.

Similarly, when the drive ring 204 rotates in reverse as well, at the barrier open position 305 the barrier cam 201b and the barrier drive ring 41 are brought into contact with each other. Then, the barrier drive ring 41 further rotates to start to tension the opening spring 44, and then, as the barrier drive ring 41 moves from the barrier open position 305 toward the barrier closed position 304, the barrier unit 206 is gradually closed. The amount of tension on the opening spring 44 changes over the section from the barrier closed position 304 to the barrier open position 305. Therefore, the torque needed for rotation of the drive ring 204 changes within this section irrespective of the direction of movement of the drive ring 204. Also, the section in which the change in torque is large is within a section in which the reset signal 323 is at "H" level. Moreover, on the extension side of the barrier open position 305, the spring force of the opening spring 44 does not affect the rotation of the drive ring 204.

When the drive ring 204 is further rotated from the lens barrier open position 305 in a direction in which the focus lens is extended, after the drive ring 204 passes the phase of a position 306, the flange 204a passes the reset member 61, so that the former no longer blocks the latter. Thus, the reset signal 323 switches to "L" at the position 306. This position 306 is the AF reset position.

The phase of a position 307 to which the drive ring 204 is further rotated to further extend the focus lens is set as an AF scan starting point. Ordinarily, when the power is turned on or after shooting, the focus lens is stopped at the position 307. When the drive ring 204 is slightly rotated from the position 307, a focus lens extension position 308 at which the focus is at infinity is reached. A position 309 that is reached by further extension of the focus lens is a fixed point position. The fixed point position 309 is a position determined by the circle of least confusion and the f-number such that focusing can be achieved over the largest possible range from infinity to a close range during pan focus. When the focus position cannot be detected during pan focus or AF (Auto Focus), photography is carried out with the focus lens at this fixed point position 309. As the focus lens is further extended, the focus adjustment range gradually approaches toward a closer range, eventually reaching the near limit position 310.

Figure 11:
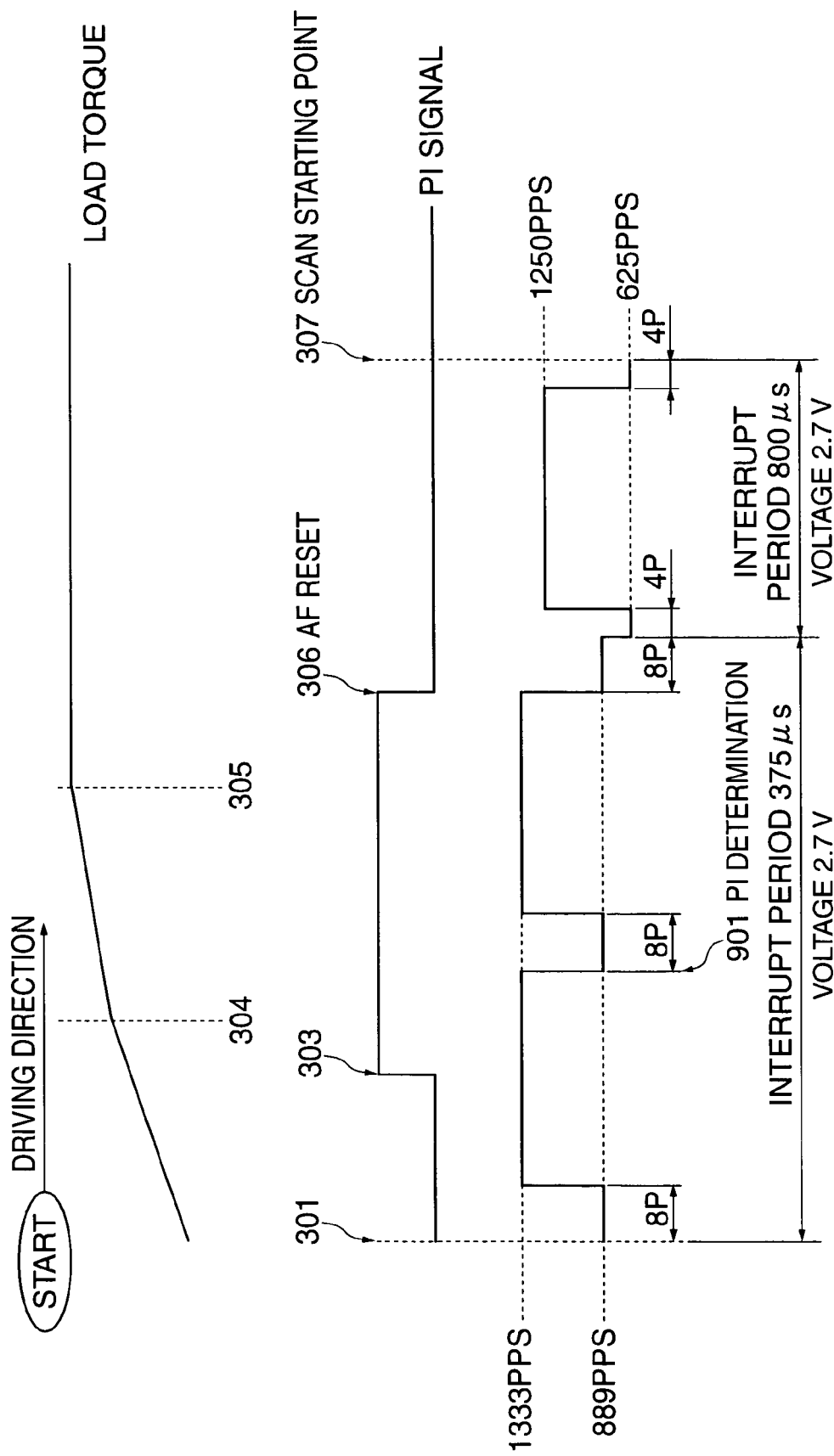
FIG. 11 is a sequence diagram showing driving of the lens barrel immediately after the power is turned on when the capacity of the battery is determined to be low.

Next, a description will be given of a sequence for moving the lens barrel 200. FIG. 10 is a sequence diagram showing a lens barrel 200 driving sequence carried out immediately after the power is turned on when it is determined that the battery capacity is sufficient. FIG. 11 is a sequence diagram showing a lens barrel 200 driving sequence carried out immediately after the power is turned on when it is determined that the battery capacity is insufficient.

When the power is turned on, the battery check circuit in the power supply controller 112 checks the voltage of the battery and compares the result with a predetermined threshold value. If the result indicates that the battery voltage exceeds the threshold value, the remaining battery capacity is deemed to be sufficient and then the sequence in FIG. 10 is executed. If the result indicates that the battery voltage is below the threshold value, the remaining battery capacity is deemed to be insufficient and then the sequence in FIG. 11 is executed.

When the battery capacity is sufficient, according to the sequence in FIG. 10, a voltage supplied to the AF motor 114 implemented by a stepping motor (AF motor 214) is set to 3.0 volts higher than the minimum required voltage. The frequency of pulses supplied to the AF motor 114 is determined by the period of interruption that can be applied. The interrupt period is set to 300 μs.

Then, as shown in FIG. 10, first, the AF motor 114 is rotated by 8 pulses at a drive frequency of 883 PPS from the retraction limit position 301, and from the next pulse the drive frequency is changed to 1111 PPS and the AF motor 114 is rotated by 8 pulses. The drive frequency is then further changed to 1667 PPS and the AF motor 114 continues to be rotated. A stepping motor is used for the AF motor 114, and therefore, by stepwise accelerating as stated above, the number of rotations can be increased up to a speed at which the stepping motor cannot be rotated by "pull-in torque". Moreover, in this case, to compensate for a drop in the torque caused by the increased drive frequency of the stepping motor, the voltage supplied to the stepping motor is increased to 3.0 volts so as to suppress the drop in the torque.

The drive ring 204 is thus rotated by the rotation of the AF motor 114 to extend the focus lens. At a position 901 past a position 303 at which the reset signal (PI) 323 switches from "L" to "H", a PI determination sequence (reset signal determination process) is started. At this time, the drive frequency is decelerated to the initial speed of 883 PPS. Then, the battery check is again carried out, and if it is determined that the battery voltage has fallen below the threshold value and the remaining battery capacity is insufficient, the interrupt period is switched, followed by the sequence in FIG. 11 being executed. If it is determined that the voltage is sufficient, the drive frequency is again accelerated in two stages by 8 pulses, so that the AF motor 114 is rotated at the drive frequency of 1667 PPS. Then, the AF motor 114 is driven to bring the drive ring 204 to the AF reset position 306, and after resetting, the AF motor 114 is again decelerated in two stages by 8 pulses, so that the AF motor 114 is rotated at the drive frequency of 1111 PPS and then 883 PPS.

Thereafter, the interrupt period is set to 800 μs and the drive voltage is switched to 2.7 volts. After the AF motor 114 is driven by 4 pulses at a drive speed of 625 PPS determined by the 800 μs interrupt period, the AF motor 114 is then driven at 1250 PPS to a point 4 pulses before the scan starting point 307. Then, the drive speed is decelerated to 625 PPS and the AF motor 114 is stopped at the scan starting point 307.

The AF motor 114 is thus moved at 1667 PPS up to the AF reset position 306 because, even if the AF motor 114 gets out of step (a phenomenon that the motor does not rotate even with pulses being input thereto) and the pulse count and the position of the lens lose synchronism, the AF motor is reset at the AF reset position 306 so that the pulse count can be corrected according to the position of the lens. Moreover, a force that releases the tension of the opening spring 44 of the lens barrier acts up to the barrier open position 305, which creates surplus torque that can be used for high-speed drive of the focus lens. Moreover, the position 305 and the position 306 are disposed as close to each other as possible. After the reset, no deviation in the position of the focus lens is permitted, and therefore, the AF motor 114 is driven at a speed lower than the speed at which it has been driven up to the AF reset position 306, i.e. at a speed of 1250 PPS, so as to provide surplus torque.

On the other hand, when the battery check indicates that the voltage is below the threshold value, the drive sequence shown in FIG. 11 is executed.

As can be seen from a comparison with the drive sequence of FIG. 10, the drive sequence in FIG. 11 differs in the voltage applied to the AF motor 114 and the interrupt period, as well as the drive frequency and the number of acceleration/deceleration steps, which are applied from the retraction limit position 301 until deceleration after the AF reset position 306. Specifically, the voltage is 2.7 volts, which is an ordinary voltage, and the interrupt period is set to 375 μs. The AF motor 114 is first driven by 8 pulses at a drive speed of 889 PPS determined by the interrupt period, after which it is driven at 1333 PPS. A PI determination is carried out at the same position 901 as in FIG. 10.

The remaining operations are the same as when the battery capacity is deemed to be insufficient by the PI determination in FIG. 10. Namely, after the AF motor 114 is driven by 8 pulses at 889 PPS, the AF motor 114 is driven at 1333 PPS up to the AF reset position 306, reset at the position 306, and then driven at a decelerated speed of 889 PPS by 8 pulses, after which the interrupt period is set to 800 μs and thereafter the AF motor 114 is driven by only 4 more pulses at 625 PPS before the drive frequency becomes 1250 PPS, as is the case with the sequence in FIG. 10. During this driving as well the voltage is set to the lower voltage of 2.7 volts. However, up to the AF reset position 306 the count can be corrected and the load decreases due to the force of the spring, and therefore the drive frequency used from the retraction limit position 301 up to the AF reset position 306 is set to 1333 PPS higher than the 1250 PPS used after the reset.

Thus, as described above, with respect to the drive sequence of the lens barrel 200 immediately after power-on, when the remaining battery capacity is deemed to be sufficient and even when the battery capacity is deemed to be insufficient, the drive frequency is set to be higher up to the AF reset than an ordinary drive frequency used after the AF reset in order to drive the AF motor 114 more quickly. As a result, the lens extension is faster and the start-up time can be shortened. This high speed operation is possible because the force of the opening spring 44 lightens the load exerted on the AF motor 114 up to the barrier open position 305 and thus creates surplus torque, and because the drive speed is decreased to an ordinary low speed after resetting, which makes it possible to correct the pulse count at the reset even if the drive speed used until the reset is fast enough to run the risk of a loss of synchronism and hence the lens getting out of position.

After AF reset, by counting the number of pulses by which the AF motor 114 has been moved from the AF reset position 306 with reference to the same position, the focus lens can be extended to a position that corresponds to the scan starting point or the subject distance.

Moreover, when the battery check indicates that the remaining battery capacity is sufficient, the AF motor 114 is driven at a higher speed through a multiple steps of acceleration than when the remaining battery capacity is determined to be insufficient. As a result, the speed at which the focus lens can be extended from the body of the camera can be increased, thus reducing the start-up time required before shooting can be started after the power is turned on with the lens being fully retracted.

Figure 12:
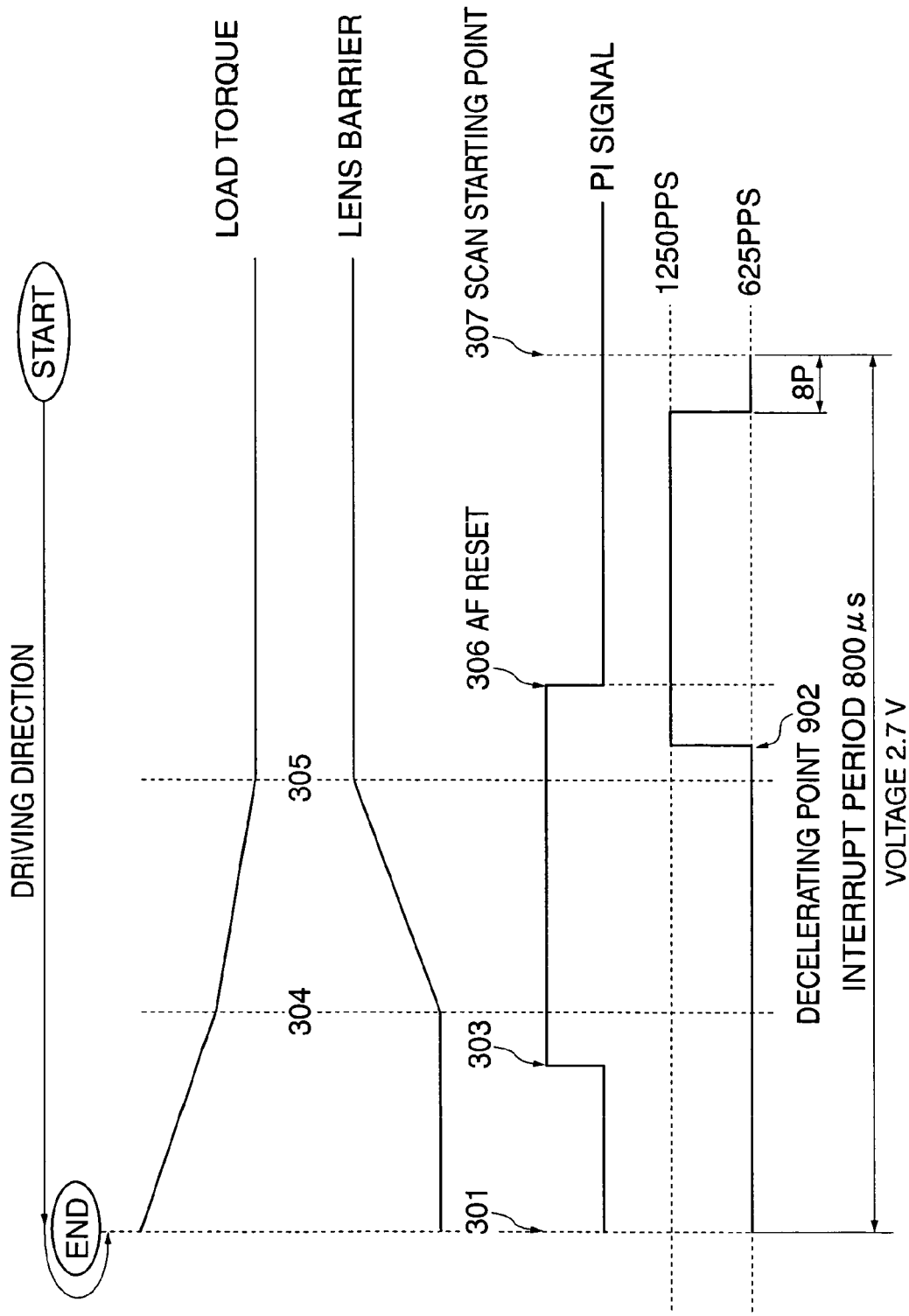
FIG. 12 is a sequence diagram showing driving of the lens barrel immediately after the power is turned off.

Next, a description will be given of a drive sequence of the lens barrel 200 carried out immediately after the power is turned off. FIG. 12 is a lens barrel 200 driving sequence diagram showing the sequence carried out immediately after the power is turned off.

A position at which the focus lens is stopped after the power is turned on or after shooting is always the scan starting point 307. Therefore, the sequence immediately after power off, as shown in FIG. 12, starts from the scan starting point 307, from which the AF motor 114 is driven by 8 pulses in the direction of retraction at a normal interrupt period of 800 μs, with a voltage of 2.7 volts applied to the AF motor 114 and at a drive speed of 625 PPS, after which the AF motor 114 is accelerated to 1250 PPS. Then, at a position 902 just before the barrier open position 305 at which the lens barrier starts to close, the AF motor 114 is decelerated to 625 PPS. This decelerating position 902 is disposed intermediate between the barrier open position 305 and the AF reset position 306. A large drive torque is required to tension the opening spring 44 while the focus lens is on the retraction side of the barrier open position 305, and therefore the AF motor 114 is decelerated to and driven at 625 PPS until the AF motor 114 stops at the retraction limit position 301. When the stepping motor is driven at such a low speed, its torque increases even if the voltage applied thereto is not changed, making it more difficult for a loss of synchronism to occur.

After the AF motor 114 passes the barrier closed position 304, the tension of the closing spring 45 is added and the load on the AF motor 114 further increases as the AF motor approaches the retraction limit position 301. Accordingly, the possibility of occurrence of a loss of synchronism increases in the vicinity of the retraction limit, and therefore the reset position 303 is provided near the retraction limit. After retraction limit position reset is carried out at the reset position 303, the AF motor 114 is driven to a position set as the retraction limit position 301, which is reached after driving a predetermined number of pulses from the reset position 303.

The AF motor 114 uses a large number of gears for acceleration and deceleration, and thus undergoes gear backlash. As a result, the driving of the lens is accompanied by a difference in the position of the lens between when the AF motor is moved in one direction and when it is moved in the opposite direction. To address this problem, the AF motor 114 is not stopped as is at the retraction limit position 301 but, to shorten the next start-up time, a number of pulses required to eliminate this position difference is applied to the AF motor 114 so as to rotate the motor in reverse, after which it is then stopped.

During shooting, the functions for shooting often use interrupt processing, and as described above, there is surplus torque, an interrupt period of 800 μs alone is used, with drive speeds of 625 PPS and 1250 PPS at a voltage of 2.7 V. During waiting for shooting, the focus lens is always stopped at the scan starting point 307. AF scan is started at this scan starting point 307.

Figure 15B:
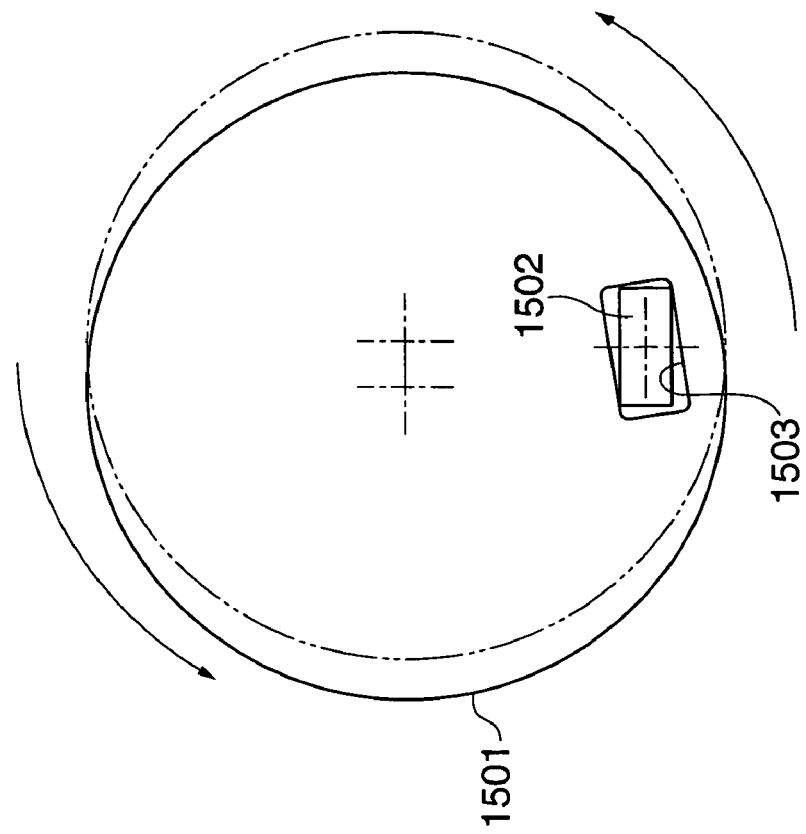
FIGS. 15A and 15B are views useful in explaining movement of a lens due to backlash of a translatory movement key.
Figure 15A:
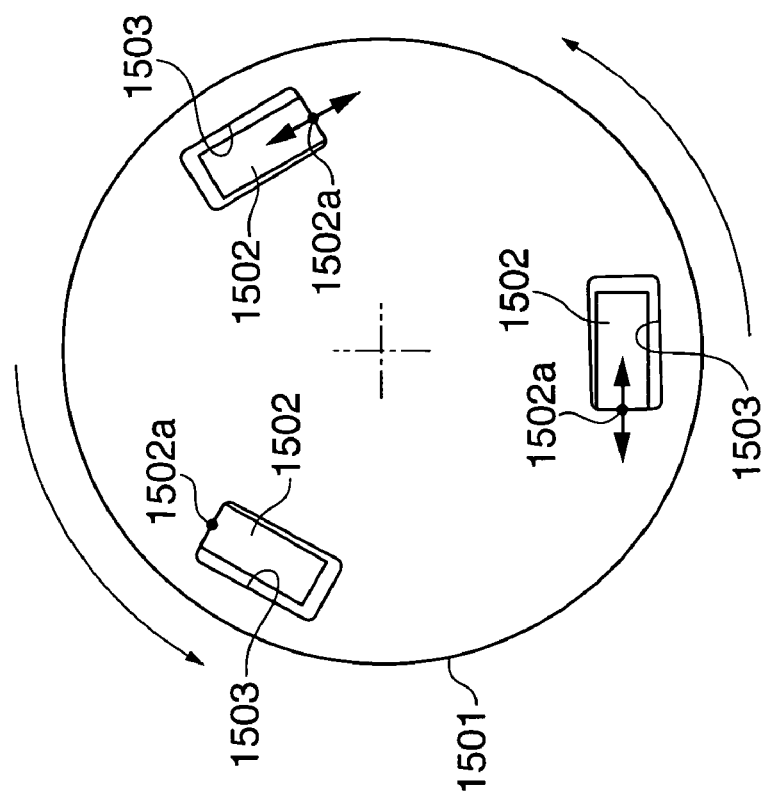

Now, a detailed description will be given of movements of various members or parts due to backlash (play) referred to above. FIG. 15A and FIG. 15B are views useful in explaining movement of a lens due to backlash between a translatory movement key 1502 that guides and moves the lens along the optical axis and a lens barrel 1501 supporting the lens. FIG. 15A is a view useful in explaining a case where three translatory movement keys 1502 are used, and FIG. 15B is a view useful in explaining a case where a single translatory movement key 1502 is used. Like the translatory movement key 201a, the translatory movement key 1502 is engaged in a groove 1503 formed in the lens barrel 1501 to restrain movement of the lens barrel 1501 in a direction along the optical axis.

As shown in FIG. 15A, when a cam, not shown, rotates in a direction indicated by the arrows, due to a slight amount of backlash between the translatory movement keys 1502 and three grooves 1503 formed in the lens barrel 1501, the translatory movement keys 1502 and the respective grooves 1503 in the lens barrel 1501 are brought into contact with each other at three contact points 1502a. Due to the contacting of the lens barrel 1501 and the translatory movement keys 1502 at the three contact points 1502a, the directions in which forces are applied to the lens barrel 1501 are balanced so that the lens barrel 1501 hardly changes in position, though it may slightly rotate. On the other hand, in the case where a single translatory movement key 1502 is provided as shown in FIG. 15B, the lens barrel 1501 rotates by an amount corresponding to the backlash amount in a direction of rotation (indicated by the arrows in FIG. 15B). Thus, compared with the case where the three translatory keys 1502 are provided (FIG. 15A), the amount of movement of the lens barrel 1501 in the direction of rotation is greater. That is, the lens barrel 1501 is given the greater amount of freedom for movement, and consequently the optical axis shifts. Further, a cam pin which receives a rotative force from the cam is often located in the vicinity of a base portion of the lens barrel 1501. In the case of the single translatory movement key 1502, this rotative force can cause the front end of the lens barrel 1501 and the rear end of the same to exhibit different motions from each other about the contact point of the translatory movement key 1502 and the groove 1503, thus often resulting in inclination of the lens.

Therefore, to restrain the occurrence of an image shake, it is desirable that as many translatory movement keys as possible are formed, that is, desirably three, or at least two translatory movement keys should be formed to prevent the lens barrel from being shifted, for example. In other words, even if an attempt is made to design the camera more compact in size by reducing the number of translatory movement keys used, an image shake can occur due to shift or the like of the lens barrel, which gives an unpleasant feeling to the user. In view of this, the present embodiment provides a solution described below to prevent an unpleasant feeling from being given to the user.

Figure 13:
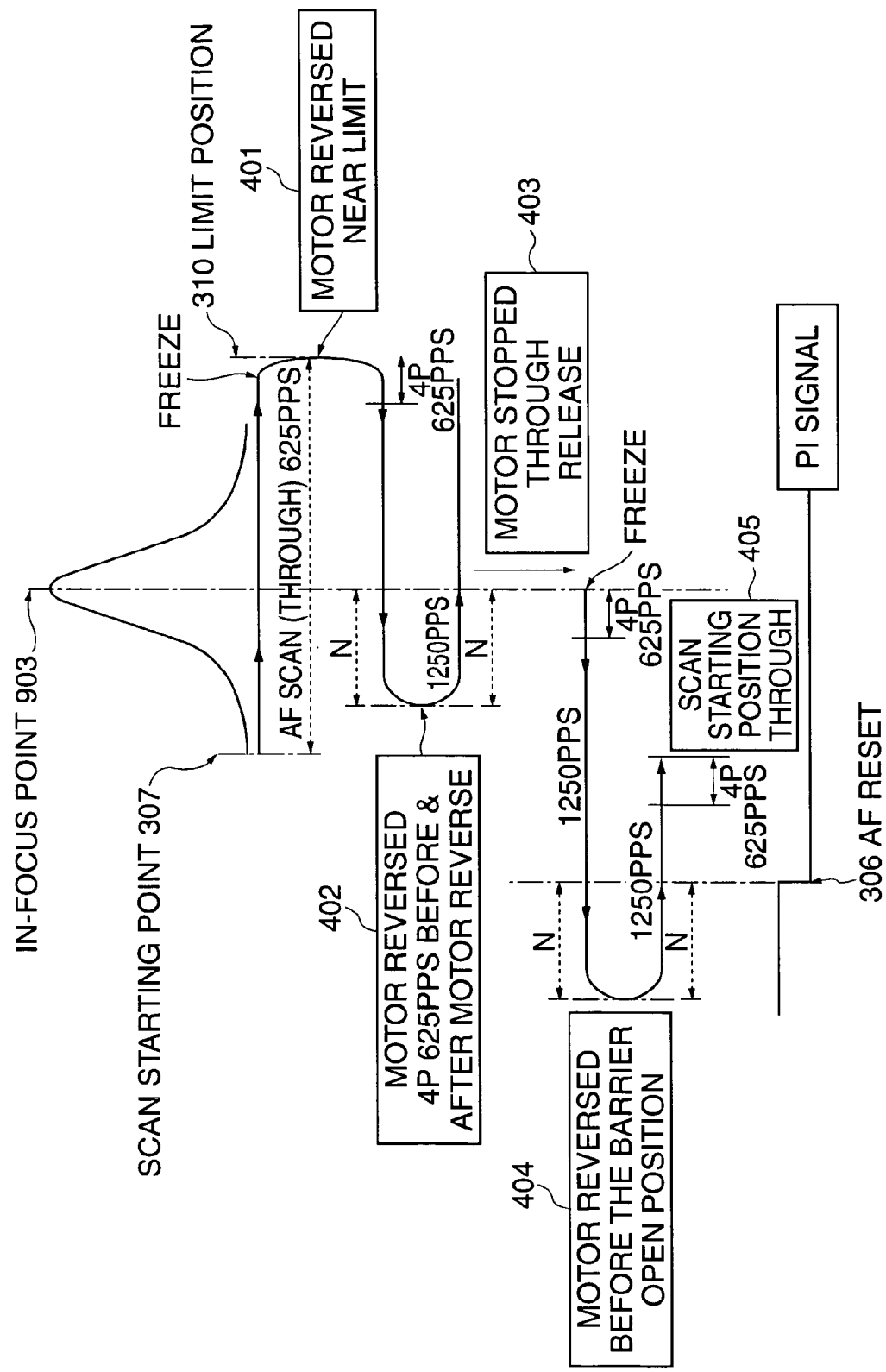
FIG. 13 is a schematic diagram showing a lens barrel driving sequence during AF scan.
Figure 14:
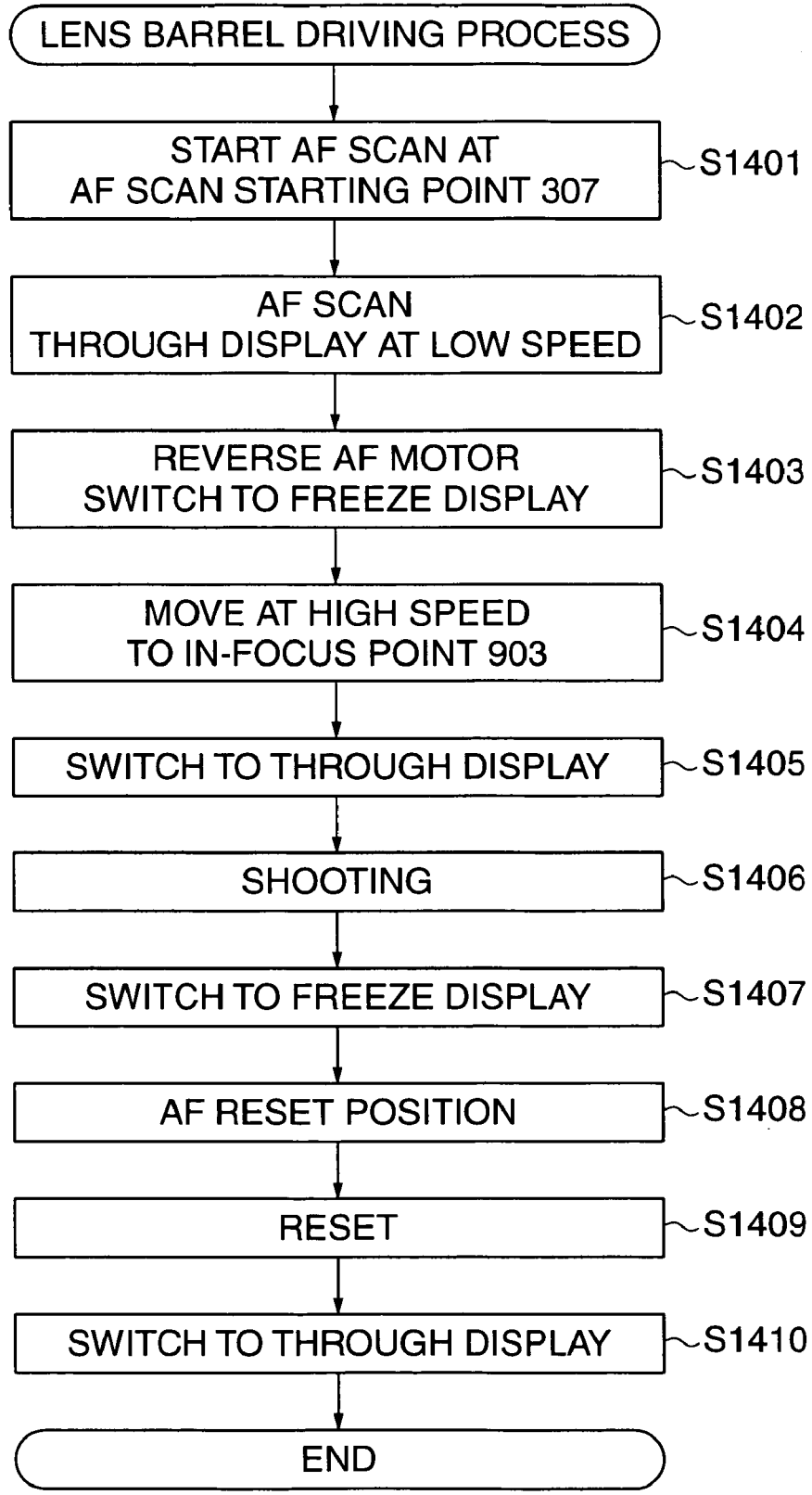
FIG. 14 is a flowchart showing a lens barrel driving process during AF scan.

FIG. 13 is a schematic diagram showing a lens barrel 200 driving sequence during AF scan, and FIG. 14 is a flowchart showing a lens barrel driving process during AF scan. It should be noted that a program for executing this sequence may be stored in a storage device within the digital camera 1 and executed by the CPU 11 to thereby implement the lens barrel driving process described hereinbelow.

As shown FIGS. 13 and 14, AF scan is started at the scan starting point 307 (step S1401). During AF scan, the focus lens is driven at the low speed of 625 PPS and the display screen of the LCD 14 is set to the through display (step S1402). The AF scan is carried out such that while the focus lens is moved, high-frequency components of an image at each position of the focus lens are scanned or read, the amount of the high-frequency components is sampled as a focus evaluation value, and a peak thereof is determined. To this end, the focus lens is moved from the scan starting point 307 to the near limit position 310, or, if not in macro mode, to a predetermined position immediately preceding the position 310, while image sampling is carried out. Therefore, the focus lens must be moved at a low speed. Although in the present embodiment, scanning is carried out from the starting point 307 to the near limit position 310, this is not limitative. For example, scanning may be carried out over a predetermined stroke range, e.g. from the starting point 307 to the fixed point position 309, or from the starting point 307 to a position corresponding to a distance of 0.5 meters from the object.

Thereafter, the AF motor 114 is reversed at the near limit position 310 and in accordance with the reversal, the display screen is set to the freeze display to restrain the through display (as indicated by reference numeral 401 in FIG. 13) (step S1403). Then, a position 903 corresponding to the peak is taken as the in-focus point and the focus lens is moved toward that position. First, after the reversal of the motor rotation in the step S1403, acceleration control is carried out such that the AF motor 114 is driven at 625 PPS by 4 pulses and then accelerated to 1250 PPS, to bring the focus lens to a point a predetermined number of pulses N beyond the in-focus point 903 and reverse the AF motor 114 (see 402 in FIG. 13). The predetermined number of pulses N is determined by the amount of hysteresis of the focus lens and set to a number of pulses equivalent to the sum of the hysteresis amount of the focus lens and a margin, with mass production tolerances taken into account. At this time, the AF motor 114 is decelerated to 625 PPS by 4 pulses before the reversal and then stopped, and after being reversed, the AF motor 114 is again driven at 625 PPS by 4 pulses (402 in FIG. 13), accelerated to 1250 PPS, decelerated to 625 PPS by 4 pulses immediately before being stopped, and stopped when the focus lens is moved to the in-focus point 903 after driving by N pulses from the second reversal (step S1404) (see 403 in FIG. 13).

After the display screen of the LCD 18 is set to the freeze display at the first reversal (step S1403), the display screen continues to carry out the freeze display, and after the stop of the AF motor 114 in the step S1404, the display screen is again set to the through display to display an image then being shot in real time on the LCD 14 (step S1405) Thereafter, the shutter is operated to carry but shooting (403 in FIG. 13) (step S1406).

After shooting, display of the shot image is started according to the freeze display again (step S1407). After shooting is completed, when the release button is pressed, the operation at the AF reset position 306 is carried out (step S1408). Also at this position, the driving direction of the focus lens is reversed and hence the focus lens is driven while the freeze display is continued. The focus lens is driven at the same speed of 625 PPS by 4 pulses and then driven at 1250 PPS in the direction of retraction, and after the AF reset position 306 is exceeded, the AF motor 114 is reversed immediately before the barrier open position 305 (404 in FIG. 13), and then driven in the direction of extension and reset (step S1409), followed by returning to the scan starting position 307 (405 in FIG. 13). At this time, the display screen is set to the through display (step S1410).

On the display screen switched from the through display to the freeze display in the step S1403, an image which is frozen at this switchover may be displayed, or an image at the scan starting position may be displayed. Also alternatively, an image at the in-focus point 903 or in its vicinity may be displayed. By thus preventing an image shot through the lens which is inclined due to the reversal of the AF motor 114 from being displayed, it is possible to prevent a fluctuation or variation in the frame image which feels sudden or unexpected to the photographer (user).

Although it has been described above that during the freeze display, an image is displayed, this is not limitative, but, for example, the display device may be darkened to inhibit image display. Further, in the present embodiment, a limitation is imposed upon the through display on the LCD 4 at the time of reversal so as to enable the user (photographer) to follow up the object. However, even in earlier timing than this, display of a fluctuation or variation of the angle of view due to inclination of the lens or the like may be restrained, to provide some effects such as prevention of an unpleasant feeling from being given to the user (photographer).

As described above, according to the present embodiment, since an image shake is not displayed on the display means, the user is never given an unpleasant feeling. Moreover, since during AF scan in which the focus lens is moved at a low speed through driving of the AF motor at 625 PPS, the display screen is set to the through display, while at a time point the moving direction of the lens is changed when an image shake is likely to occur, the display screen is set to the freeze display and at the same time the lens is moved at a high speed of 1250 PPS to thereby shorten the freeze display time period, the ratio of the time period of the through display is greater than that of the freeze display. As a result, when shooting a moving object, for example, it is possible to follow up the object while viewing the screen of the LCD 14. Further, since an image shake is not reflected or displayed on the screen, the user can be prevented from being given an unpleasant feeling.

Since in the digital camera 1 according to the present embodiment, the number of translatory movement keys 201*a* used is reduced to one, an image shake is likely to occur due to backlash (play) as mentioned before. However, even if an image shake occurs due to backlash, the image shake is not displayed on the display screen, and thus the user does not feel unpleasant. Therefore, by reducing the number of translatory movement keys used, the space efficiency is improved, which is advantageous in designing the camera compact in size.

Moreover, since in the shooting zone, the focus lens is driven at a low speed using a lower drive frequency than the drive frequency at the start of the AF motor where it is driven at the maximum drive frequency of 1250 PPS, the possibility that the AF motor 114 undergoes a loss of synchronism is low. Besides, since after passing the scan starting position 307 during AF operation, the AF motor 114 does not pass the barrier drive zone, the drive torque required for the AF motor 114 is reduced to a constant low value, whereby the possibility of a loss of synchronism of the AF motor 114 is reduced. In addition, even if a loss of synchronism occurs, the focus lens is reset again, and accordingly, in the next shooting, the lens position is properly corrected, making it possible to avoid that shooting is carried out with the lens out of proper position.

The present invention is not limited to the apparatus according to the above described embodiment and may either be applied to a system composed of a plurality of apparatuses or to a single apparatus.

It is to be understood that the object of the present invention may also be accomplished by supplying a system or an apparatus with a storage medium in which a software program code which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence a storage medium on which the program code is stored constitutes the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

INDUSTRIAL APPLICABILITY

As described in detail above, according to the present invention, an image shake is not displayed on the display means, which can prevent an unpleasant feeling from being given to the user.

The invention claimed is:

1. An image pickup apparatus comprising:
   an image pickup unit that outputs a signal in response to light received from an object via a lens unit;
   a lens moving unit configured to move the lens unit in first and second directions along an optical axis, the second direction being opposite to the first direction;
   an adjusting unit that carries out focus adjustment based on the signal output from said image pickup unit according to movement of the lens unit;
   a display unit that displays an image based on the signal output from said image pickup unit; and
   a control unit that controls said display unit, while said adjusting unit is carrying out the focus adjustment, to display the image when the lens unit is being moved in the first direction, and imposes a display limitation on said display unit when the lens unit is being reversely moved in the second direction after moving the lens unit in the first direction,
   wherein the display limitation comprises displaying the image in a freeze mode or inhibiting displaying of the image while the lens is being moved in the second direction.

2. An image pickup apparatus as claimed in claim 1, wherein said control unit controls said display unit to continuously display the image when the lens unit is again being reversely moved in the first direction after the lens unit is moved in the second direction.

3. An image pickup apparatus as claimed in claim 1, wherein the said control unit controls said display unit to continuously display the image displayed when the lens unit is being moved in the first direction.

4. A control method for controlling an image pickup apparatus including an image pickup unit that outputs a signal in response to light received from an object via a lens unit, a lens moving unit configured to move the lens unit in first and second directions along an optical axis, the second direction being opposite to the first direction, an adjusting unit that carries out focus adjustment based on the signal output from the image pickup unit according to movement of the lens unit and a display unit that displays an image based on the signal output from the image pickup unit, the control method comprising the steps of:
   controlling the display unit to display the image when the lens unit is being moved in the first direction while the adjusting unit is carrying out the focus adjustment; and
   imposing a display limitation on the display unit when the lens unit is being reversely moved in the second direction after moving the lens unit in the first direction while the adjusting unit is carrying out the focus adjustment,
   wherein the display limitation comprises displaying the image in a freeze mode or inhibiting displaying of the image while the lens is moving in the second direction.

5. A storage device storing a program for controlling an image pickup apparatus including an image pickup unit that outputs a signal in response to light received from an object via a lens unit, a lens moving unit configured to move the lens unit in first and second directions along an optical axis, the second direction being opposite to the first direction, an adjusting unit that carries out focus adjustment based on the signal output from the image pickup unit according to movement of the lens unit, and a display unit that displays an image based on the signal output from the image pickup unit, the computer program including the instructions for:
   controlling the display unit to display the image when the lens unit is being moved in a first direction while the adjusting unit is carrying out the focus adjustment; and
   imposing a display limitation on the display unit when the lens unit is being reversely moved in the second direction after moving the lens unit in the first direction while the adjusting unit is carrying out the focus adjustment,
   wherein the display limitation comprises displaying the image in a freeze mode or inhibiting displaying of the image while the lens is moving in the second direction.

* * * * *